(12) United States Patent
Yapp

(10) Patent No.: US 6,752,453 B1
(45) Date of Patent: Jun. 22, 2004

(54) SEAT ADJUSTING DEVICE OF AN EXERCISING CYCLE

(76) Inventor: Charles Yapp, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/402,766

(22) Filed: Mar. 29, 2003

(51) Int. Cl.[7] .................................................. B62J 1/00
(52) U.S. Cl. ............................... 297/215.14; 248/298.1
(58) Field of Search .................... 297/215.14; 248/298.1

(56) References Cited

U.S. PATENT DOCUMENTS

| | | | | |
|---|---|---|---|---|
| RE3,297 E | * | 2/1869 | Hanlon et al. ......... | 297/215.14 |
| 163,909 A | * | 6/1875 | Balcom .................... | 248/298.1 |
| 572,273 A | * | 12/1896 | Peterson ................ | 297/215.14 |
| 1,050,235 A | * | 1/1913 | Scanlan .................... | 248/298.1 |
| 1,050,395 A | * | 1/1913 | Schleicher ............... | 248/298.1 |
| 1,602,261 A | * | 10/1926 | Hill .......................... | 248/298.1 |
| 3,377,084 A | * | 4/1968 | Musichuk ............... | 297/215.14 |
| 3,393,886 A | * | 7/1968 | Glassman ............... | 248/298.1 |
| 3,603,609 A | * | 9/1971 | Hott .................. | 297/215.14 X |
| 3,826,459 A | * | 7/1974 | Warren .................... | 248/298.1 |
| 4,546,991 A | * | 10/1985 | Allen et al. ......... | 297/215.14 X |
| 4,657,270 A | * | 4/1987 | Allen et al. ......... | 297/215.14 X |
| 4,711,538 A | * | 12/1987 | Ohs et al. ............ | 248/298.1 X |
| 4,730,913 A | * | 3/1988 | Boothe .................... | 248/298.1 |
| 4,753,410 A | * | 6/1988 | Dyer .................... | 248/298.1 X |
| 4,772,069 A | * | 9/1988 | Szmski .................. | 297/215.14 |
| 4,915,538 A | * | 4/1990 | Golden et al. ......... | 297/215.14 |
| 5,149,034 A | * | 9/1992 | Ganaja .................... | 297/215.14 |
| 5,364,160 A | * | 11/1994 | Fritschen et al. ... | 297/215.14 X |
| 5,513,895 A | * | 5/1996 | Olson et al. ........... | 297/215.14 |
| 5,709,430 A | * | 1/1998 | Peters ............... | 297/215.14 X |
| 6,174,027 B1 | * | 1/2001 | Lemmens .......... | 297/215.14 X |

FOREIGN PATENT DOCUMENTS

DE 3445309 A1 * 6/1986 ............ 297/215.14

* cited by examiner

Primary Examiner—Rodney B. White

(57) ABSTRACT

A seat adjusting device of an exercising cycle includes a support base, an adjusting base, a positioning bolt, and a screw member. Thus, the adjusting base can slide relative to the support bracket of the support base by guidance of the positioning bolt in the adjusting slot of the adjusting base, such that the position of the seat can be adjusted easily and conveniently, thereby facilitating the user adjusting the position of the seat. In addition, the position of the seat can be adjusted arbitrarily, so that the user can adjust the seat to the optimum and most comfortable position, so as to fit the user's stature and size, thereby satisfying the user's practical requirements.

7 Claims, 6 Drawing Sheets

SEAT ADJUSTING DEVICE OF AN EXERCISING CYCLE

BACKGROUND OF THE INVENTION

1. Field of the Invention

The present invention relates to a seat adjusting device of an exercising cycle, and more particularly to a seat adjusting device of an exercising cycle, wherein the position of the seat can be adjusted arbitrarily, so that the user can adjust the seat to the optimum and most comfortable position, so as to fit the user's stature and size, thereby satisfying the user's practical requirements.

2. Description of the Related Art

A conventional seat adjusting device of an exercising cycle in accordance with the prior art shown in FIGS. 5 and 6 comprises a support base 20 having an upper end provided with a limit frame 21 and a lower end connected to the main body (not shown) of the exercising cycle, an adjusting base 10 adjustably mounted on the limit frame 21 of the support base 20 and formed with a plurality of positioning holes 11, a seat 1A mounted on the adjusting base 10, and a positioning bolt 22 screwed on the limit frame 21 of the support base 20 and inserted into one of the positioning holes 11 of the adjusting base 10. Thus, the positioning bolt 22 can be inserted into one of the positioning holes 11 of the adjusting base 10, so as to adjust the relative position between the adjusting base 10 and the limit frame 21 of the support base 20, such that the position of the seat 1A can be adjusted.

However, the positioning holes 11 of the adjusting base 10 are spaced from each other, so that the position of the seat 1A cannot be adjusted arbitrarily to the optimum and most comfortable place to fit the user's stature and cannot satisfy the user's practical requirements.

SUMMARY OF THE INVENTION

The primary objective of the present invention is to provide a seat adjusting device of an exercising cycle, wherein the adjusting base can slide relative to the support bracket of the support base by guidance of the positioning bolt in the adjusting slot of the adjusting base, such that the position of the seat can be adjusted easily and conveniently, thereby facilitating the user adjusting the position of the seat.

Another objective of the present invention is to provide a seat adjusting device of an exercising cycle, wherein the position of the seat can be adjusted arbitrarily, so that the user can adjust the seat to the optimum and most comfortable position, so as to fit the user's stature and size, thereby satisfying the user's practical requirements.

A further objective of the present invention is to provide a seat adjusting device of an exercising cycle, wherein the catch bolt is extended through the screw member and is screwed into the inner threaded section of the positioning bolt, thereby preventing the screw member from detaching from the positioning bolt due to an excessive rotation when the screw member is unscrewed from the positioning bolt.

In accordance with the present invention, there is provided a seat adjusting device of an exercising cycle, comprising a support base, an adjusting base, a positioning bolt, and a screw member, wherein:

the support base has an upper end provided with a support bracket, the support bracket of the support base has a bottom formed with a positioning hole;

the adjusting base is adjustably mounted on the support bracket of the support base and has a bottom formed with an elongated adjusting slot;

the positioning bolt is mounted in the adjusting base and extended through the adjusting slot of the adjusting base and the positioning hole of the support bracket of the support base; and the screw member is screwed on the positioning bolt and rested on the positioning tube of the support bracket of the support base.

Further benefits and advantages of the present invention will become apparent after a careful reading of the detailed description with appropriate reference to the accompanying drawings.

DETAILED DESCRIPTION OF THE INVENTION

Figure 1:
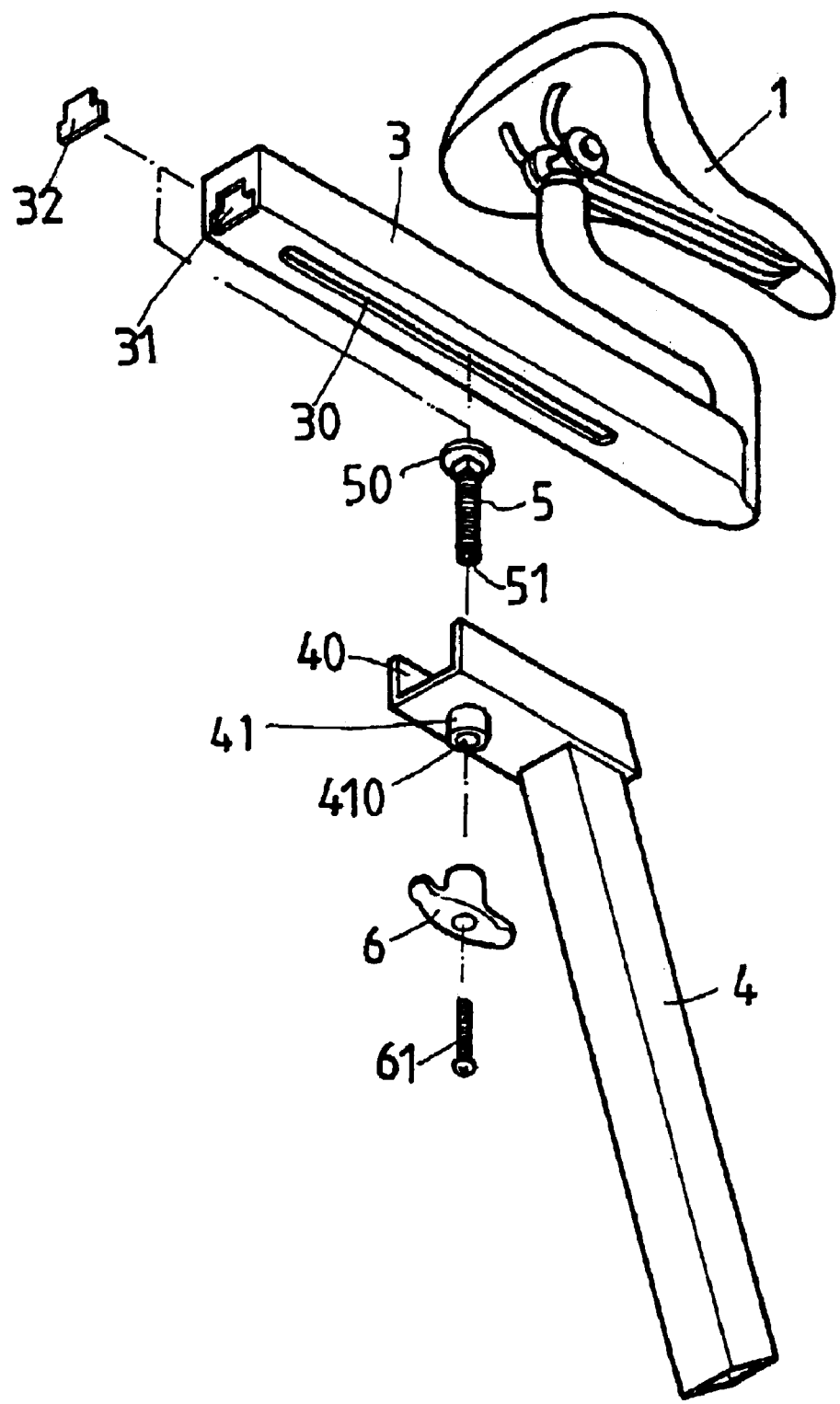
FIG. 1 is an exploded perspective view of a seat adjusting device of an exercising cycle in accordance with the preferred embodiment of the present invention.
Figure 2:
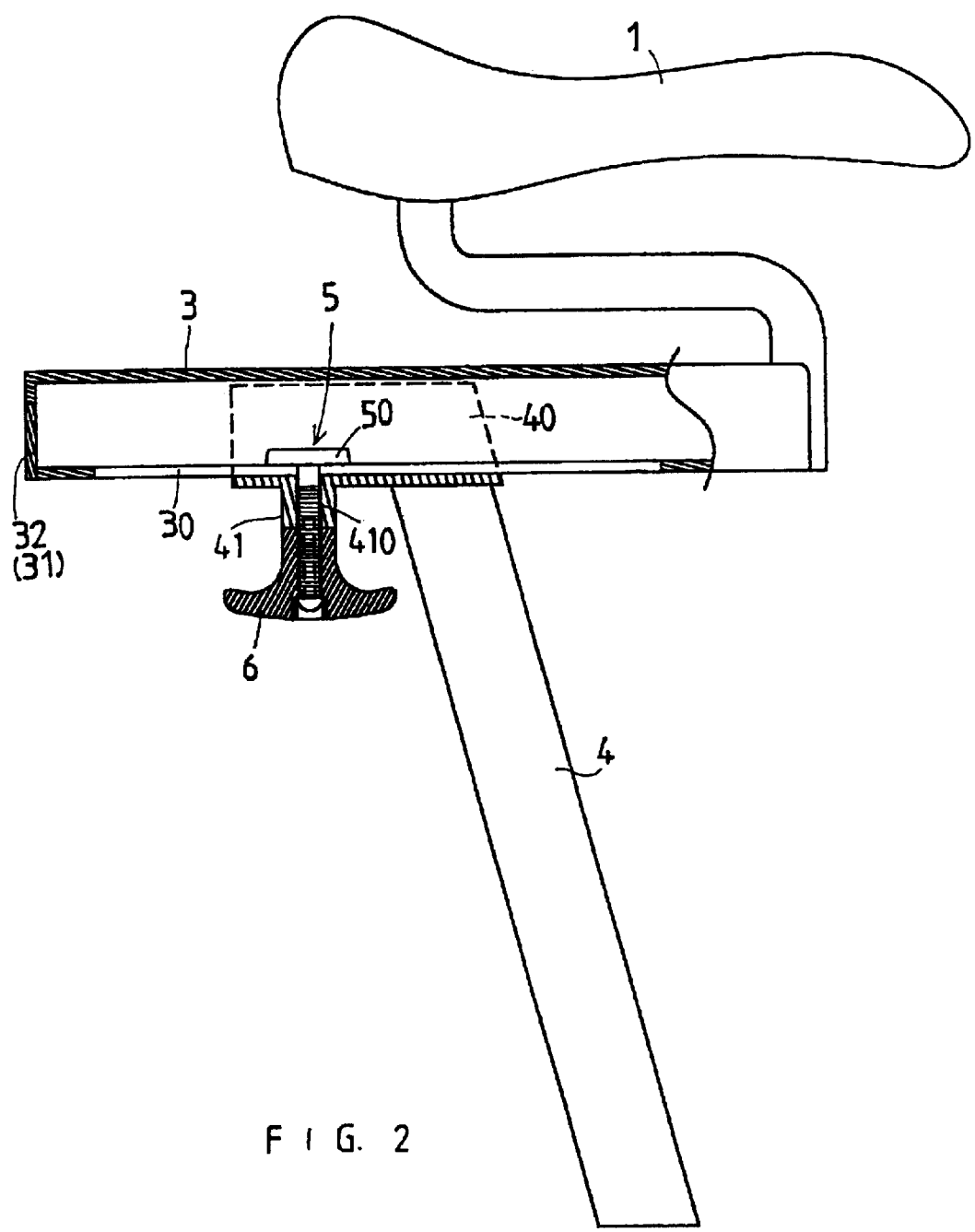
FIG. 2 is a side plan cross-sectional assembly view of the seat adjusting device of an exercising cycle as shown in FIG. 1.

Referring to the drawings and initially to FIGS. 1 and 2, a seat adjusting device of an exercising cycle in accordance with the preferred embodiment of the present invention comprises a support base 4, an adjusting base 3, a positioning bolt 5, and a screw member 6.

The support base 4 has an upper end provided with a support bracket 40 and a lower end connected to the main body (not shown) of the exercising cycle. The support bracket 40 of the support base 4 is substantially U-shaped and has a bottom formed with a positioning tube 41 formed with a positioning hole 410.

The adjusting base 3 is mounted on a bottom of the seat 1 of the exercising cycle and is adjustably mounted on the support bracket 40 of the support base 4. The adjusting base 3 is a rectangular hollow body and has a bottom formed with an elongated adjusting slot 30. The adjusting base 3 has a distal end formed with an opening 31 communicating with an inside of the adjusting base 3.

The positioning bolt 5 is mounted in the adjusting base 3 and extended through the adjusting slot 30 of the adjusting base 3 and the positioning hole 410 of the support bracket 40 of the support base 4. The positioning bolt 5 has a bolt head 50 mounted in the adjusting base 3 and rested on a wall of the adjusting slot 30 of the adjusting base 3.

The seat adjusting device further comprises a catch cover 32 secured in the opening 31 of the adjusting base 3, thereby preventing the positioning bolt 5 from detaching from the opening 31 of the adjusting base 3, and thereby enhancing the aesthetic quality of the seat adjusting device.

The screw member 6 is screwed on the positioning bolt 5 and rested on the positioning tube 41 of the support bracket 40 of the support base 4.

The positioning bolt 5 has an inside formed with an inner threaded section 51. The seat adjusting device further comprises a catch bolt 61 extended through the screw member 6 and screwed into the inner threaded section 51 of the positioning bolt 5, thereby preventing the screw member 6 from detaching from the positioning bolt 5.

In assembly, the positioning bolt 5 is mounted in the adjusting base 3 through the opening 31 of the adjusting base 3. Then, the positioning bolt 5 is extended through the adjusting slot 30 of the adjusting base 3 and the positioning hole 410 of the support bracket 40 of the support base 4, with the bolt head 50 of the positioning bolt 5 being rested on the wall of the adjusting slot 30 of the adjusting base 3. Finally, the screw member 6 is screwed on the positioning bolt 5 and rested on the positioning tube 41 of the support bracket 40 of the support base 4, so that the adjusting base 3 is adjustably mounted on the support bracket 40 of the support base 4, thereby assembling the seat adjusting device of an exercising cycle in accordance with the preferred embodiment of the present invention as shown in FIG. 2.

On the other hand, the catch cover 32 is secured in the opening 31 of the adjusting base 3, thereby preventing the positioning bolt 5 from detaching from the opening 31 of the adjusting base 3, and thereby enhancing the aesthetic quality of the seat adjusting device.

Figure 3:
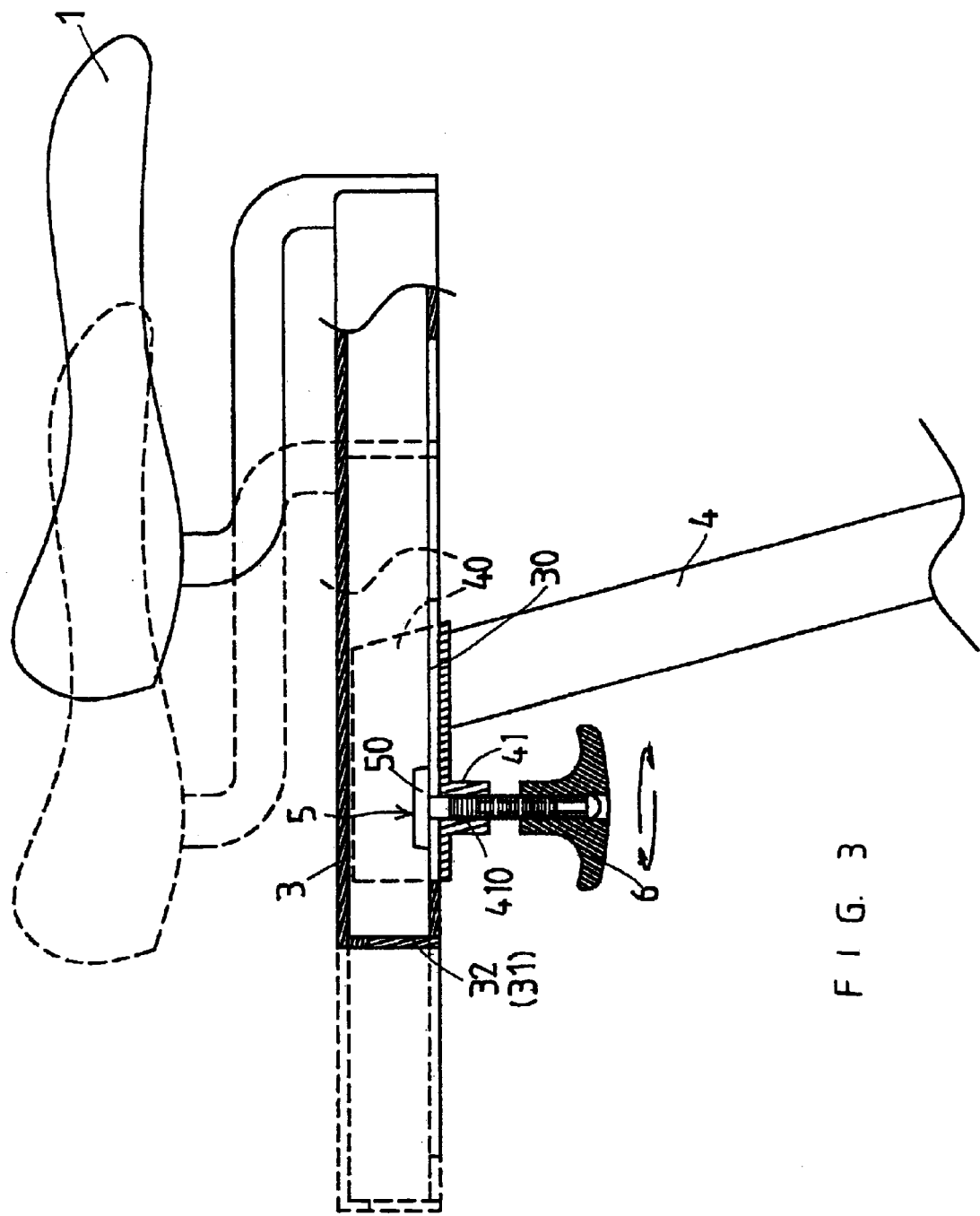
FIG. 3 is a schematic operational view of the seat adjusting device of an exercising cycle as shown in FIG. 2 in adjustment.

In adjustment, the screw member 6 is unscrewed from the positioning bolt 5 to release the positioning bolt 5, so that the positioning bolt 5 is slidable in the adjusting slot 30 of the adjusting base 3. Thus, the positioning bolt 5 is slidable in the adjusting slot 30 of the adjusting base 3, so that the adjusting base 3 can slide relative to the support bracket 40 of the support base 4, so as to adjust the position of the seat 1 as shown in FIG. 3.

Figure 4:
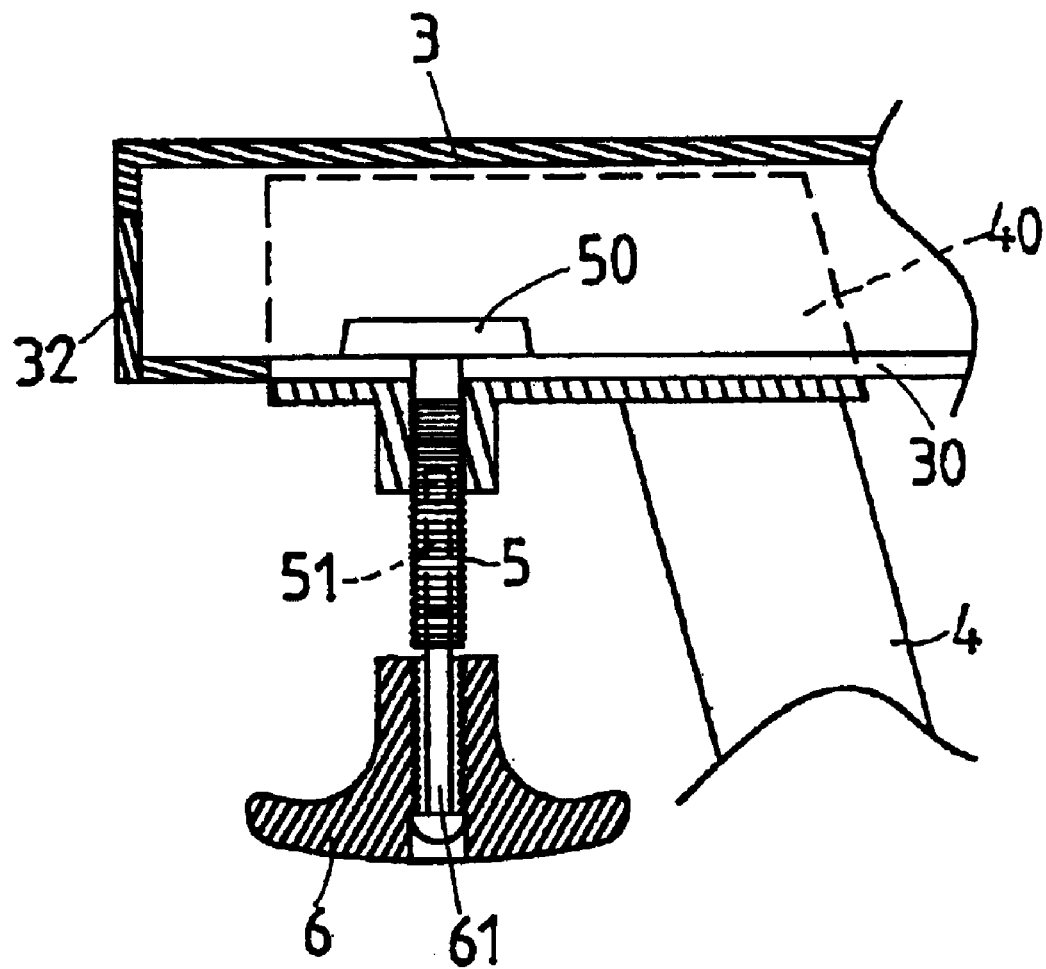
FIG. 4 is a locally schematic operational view of the seat adjusting device of an exercising cycle as shown in FIG. 2.
Figure 5:
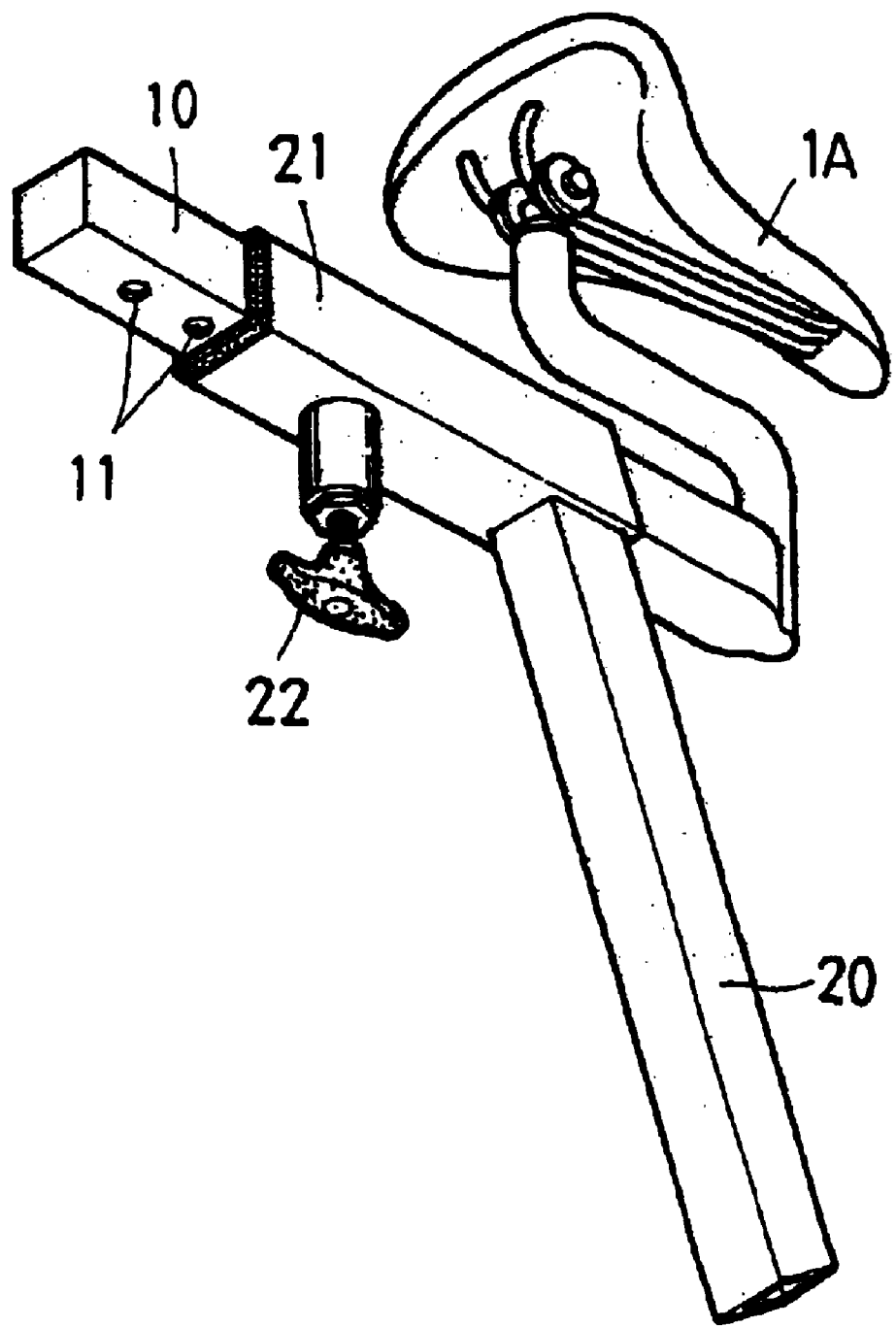
FIG. 5 is a perspective view of a conventional seat adjusting device of an exercising cycle in accordance with the prior art.
Figure 6:
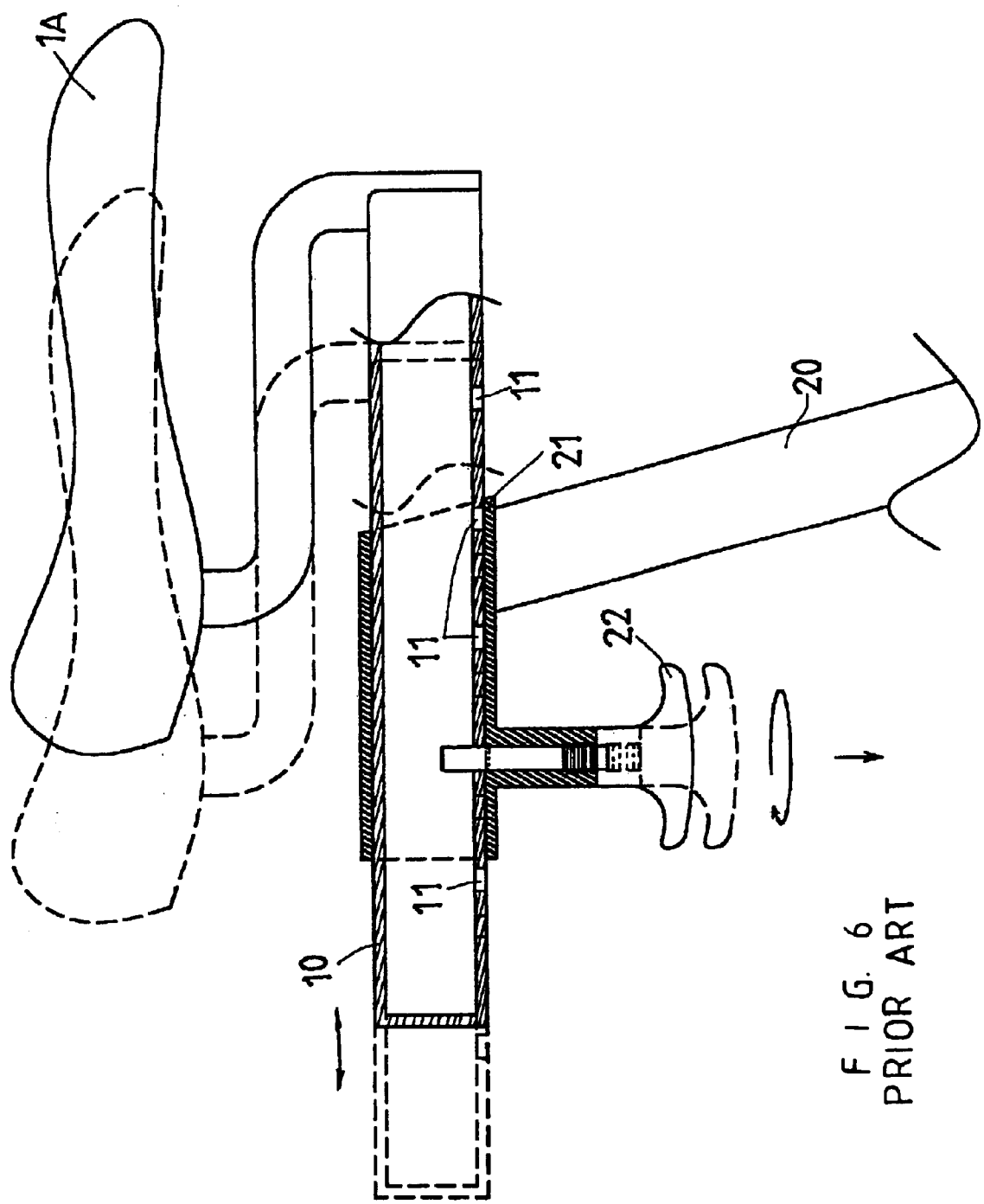
FIG. 6 is a side plan cross-sectional view of the conventional seat adjusting device of an exercising cycle as shown in FIG. 5.

As shown in FIGS. 1 and 4, the catch bolt 61 is extended through the screw member 6 and is screwed into the inner threaded section 51 of the positioning bolt 5, thereby preventing the screw member 6 from detaching from the positioning bolt 5 due to an excessive rotation when the screw member 6 is unscrewed from the positioning bolt 5.

Accordingly, the seat adjusting device of an exercising cycle in accordance with the preferred embodiment of the present invention has the following advantages.

1. The adjusting base 3 can slide relative to the support bracket 40 of the support base 4 by guidance of the positioning bolt 5 in the adjusting slot 30 of the adjusting base 3, such that the position of the seat 1 can be adjusted easily and conveniently, thereby facilitating the user adjusting the position of the seat 1.

2. The position of the seat 1 can be adjusted arbitrarily, so that the user can adjust the seat 1 to the optimum and most comfortable position, so as to fit the user's stature and size, thereby satisfying the user's practical requirements.

3. The catch bolt 61 is extended through the screw member 6 and is screwed into the inner threaded section 51 of the positioning bolt 5, thereby preventing the screw member 6 from detaching from the positioning bolt 5 due to an excessive rotation when the screw member 6 is unscrewed from the positioning bolt 5.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A seat adjusting device of an exercising cycle, comprising a support base, an adjusting base, a positioning bolt, and a screw member, wherein:

the support base has an upper end provided with a support bracket, the support bracket of the support base has a bottom formed with a positioning tube formed with a positioning hole;

the adjusting base is adjustably mounted on the support bracket of the support base and has a bottom formed with an elongated adjusting slot;

the positioning bolt is mounted in the adjusting base and extended through the adjusting slot of the adjusting base and the positioning hole of the support bracket of the support base; and the screw member is screwed on the positioning bolt and rested on the positioning tube of the support bracket of the support base.

2. The seat adjusting device of an exercising cycle in accordance with claim 1, wherein the support bracket of the support base is substantially U-shaped.

3. The seat adjusting device of an exercising cycle in accordance with claim 1, wherein the adjusting base is mounted on a bottom of a seat.

4. The seat adjusting device of an exercising cycle in accordance with claim 1, wherein the adjusting base is a rectangular hollow body.

5. The seat adjusting device of an exercising cycle in accordance with claim 1, wherein the adjusting base has a distal end formed with an opening communicating with an inside of the adjusting base, and the seat adjusting device further comprises a catch cover secured in the opening of the adjusting base, thereby preventing the positioning bolt from detaching from the opening of the adjusting base.

6. The seat adjusting device of an exercising cycle in accordance with claim 1, wherein the positioning bolt has a bolt head mounted in the adjusting base and rested on a wall of the adjusting slot of the adjusting base.

7. The seat adjusting device of an exercising cycle in accordance with claim 1, wherein the positioning bolt has an inside formed with an inner threaded section, and the seat adjusting device further comprises a catch bolt extended through the screw member and screwed into the inner threaded section of the positioning bolt, thereby preventing the screw member from detaching from the positioning bolt.

* * * * *